March 21, 1944.    L. R. WILLIAMSON    2,344,526
BRAKE AND CLUTCH OPERATING MECHANISM
Filed Feb. 5, 1941    4 Sheets-Sheet 1

INVENTOR.
LARKIN R. WILLIAMSON
BY
ATTORNEYS.

March 21, 1944.   L. R. WILLIAMSON   2,344,526
BRAKE AND CLUTCH OPERATING MECHANISM
Filed Feb. 5, 1941   4 Sheets-Sheet 2

INVENTOR.
LARKIN R. WILLIAMSON
BY
Fay, Macklin, Golrick and Williams.
ATTORNEYS.

March 21, 1944.    L. R. WILLIAMSON    2,344,526
BRAKE AND CLUTCH OPERATING MECHANISM
Filed Feb. 5, 1941    4 Sheets-Sheet 3

INVENTOR.
LARKIN R. WILLIAMSON
BY
Fay, Macklin, Gohrick and Williams
ATTORNEYS.

March 21, 1944.   L. R. WILLIAMSON   2,344,526
BRAKE AND CLUTCH OPERATING MECHANISM
Filed Feb. 5, 1941   4 Sheets-Sheet 4

INVENTOR.
LARKIN R. WILLIAMSON
BY
Fay, Macklin, Golrick and Williams
ATTORNEYS.

Patented Mar. 21, 1944

2,344,526

UNITED STATES PATENT OFFICE 2,344,526

BRAKE AND CLUTCH OPERATING MECHANISM

Larkin R. Williamson, Brooklyn, N. Y., assignor to E. W. Bliss Company

Application February 5, 1941, Serial No. 377,505

14 Claims. (Cl. 192—144)

This invention relates generally to operating mechanism for machine tools and is more particularly directed to that class of machine exemplified by metal bending brakes. Such a brake is shown in my U. S. Patent No. 2,237,170.

In tools of this class there is provided an operating ram which is mounted for reciprocating movement toward and from a bed. In normal operation the machine functions through one complete reciprocation of the ram and is then stopped while the workpiece is either removed or adjusted in a new position.

A control mechanism for such use should be accessible to the operator and to the area in which the fabrication takes place in order to permit easy manipulation of the machine. Furthermore, such a control mechanism should be positive in operation and should act quickly to provide power engagement and disengagement with maximum ease.

Tools of the size embodying the present invention are normally sufficiently large to require power actuated control mechanism in order that the workman's task may be lightened.

The general object of the present invention has been to provide mechanism for press brakes and the like which will embody the above desired features and which will in addition be relatively simple in cost. A further object of the invention has been to provide a manner of controlling the same which is accessible to the operator and positive in operation. A still further object of the invention has been to incorporate a power-operated drive to permit the use of the same on large machinery.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

Figure 1:
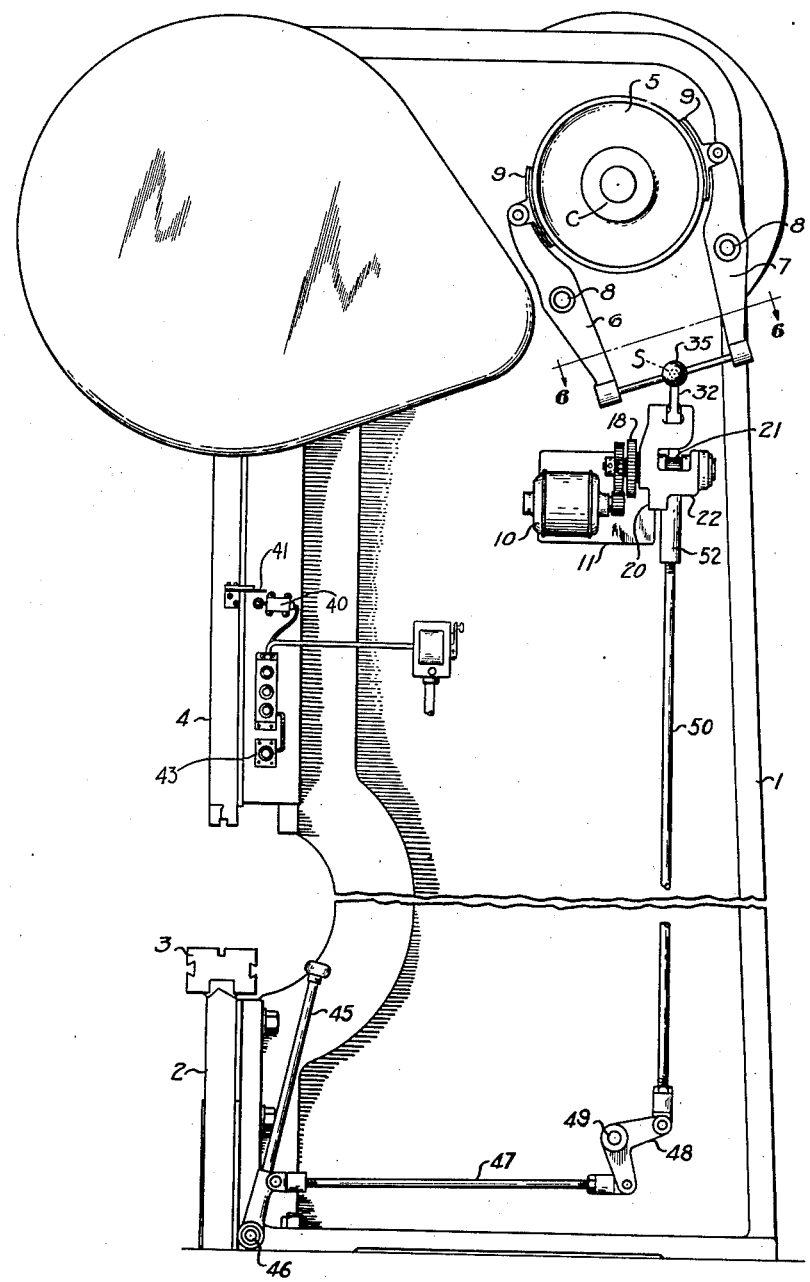
Fig. 1 is a side elevation of a metal bending brake embodying the novel clutch operating mechanism of the present invention.
Figure 2:
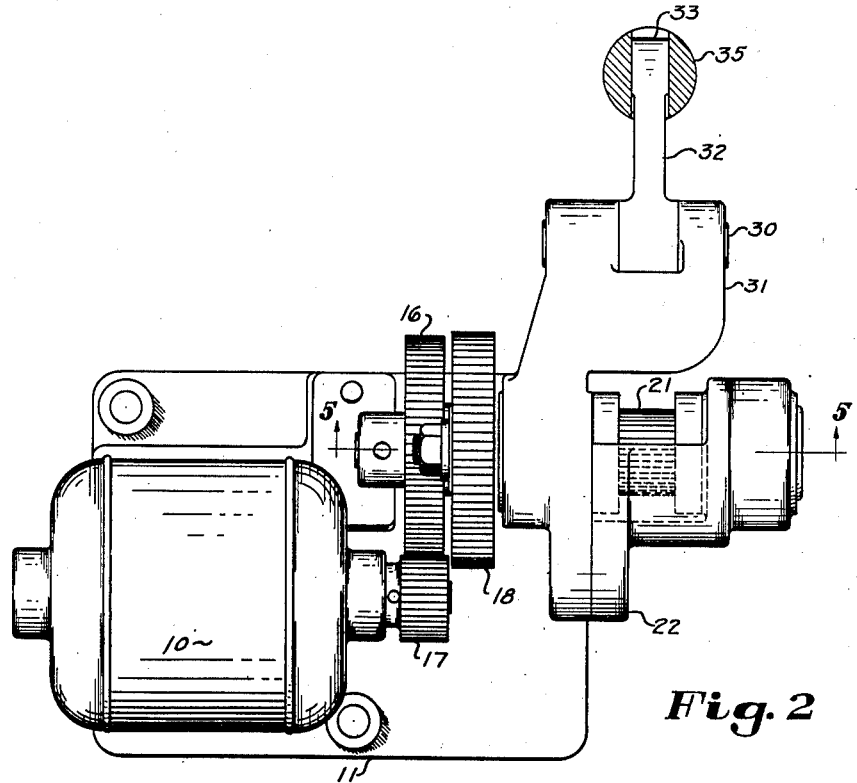
Fig. 2 is a side elevation on an enlarged scale, of the clutch operating mechanism.
Figure 3:
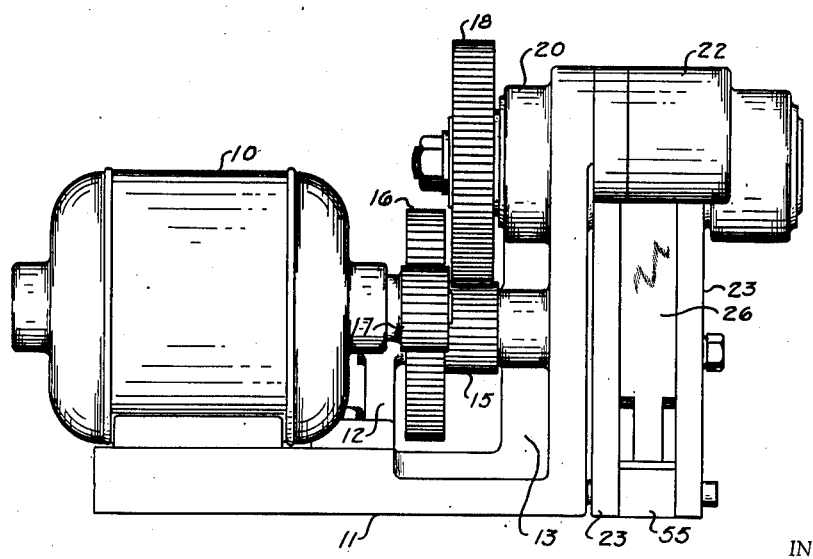
Fig. 3 is a bottom plan view of the clutch operating mechanism.
Figure 4:
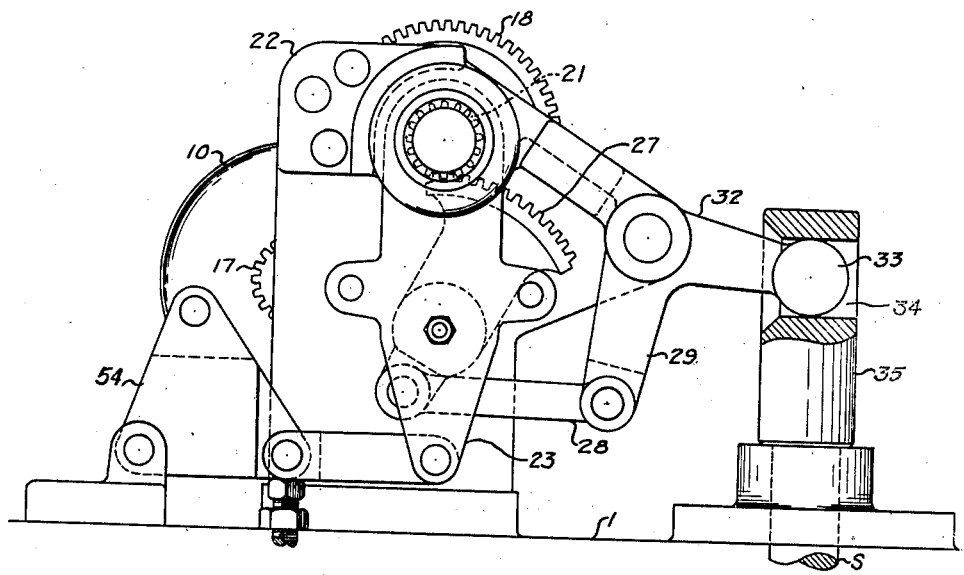
Fig. 4 is a rear elevation of the clutch operating mechanism.

Referring now to the drawings, the metal bending brake incorporated in the present invention is preferably fabricated from steel plates cut to form and then assembled as shown in Fig. 1. This will comprise a pair of side frames 1 and a bed 2 which is secured to the side frames to crossbrace the same and maintain them in an upright position. A die bed 3 is secured to the top of the bed 2 and is provided with slots in the usual manner to carry the stationary forming die of the assembly. A reciprocable die slide or ram 4 is slidable in a generally vertical plane toward and from the die bed 3 and to this end is supported in suitable gibs in the side frames 1.

To actuate the die slide 4 an electric motor is employed which operates through suitable gearing to drive an eccentric shaft positioned above the slide and operatively connected thereto by suitable pitmans. This mechanism is well known in the art and is not further described, being shown in detail in the application above referred to.

Interposed between the motor and the slide is a clutch C, which may be of any type well known in the art and embodies therein a brake 5. The operation of the mechanism is such that the brake is simultaneously set when the clutch is released and in an opposite manner when the brake is released the clutch is engaged to provide an operative drive from the motor to the slide. This clutch may be an ordinary friction clutch embodying a plurality of radial plates as shown in the application above referred to.

To engage and disengage the clutch the shaft member S is shifted along its axis, in one position engaging the clutch for a drive and in the other position releasing the same. Simultaneously with such movement a pair of levers 6 and 7 are rocked as hereafter described about pivots 8 to engage brake shoes 9 against an annular brake surface disposed therebetween.

The clutch and brake operating mechanism is driven from a torque motor 10 which is mounted on a bracket 11 secured to the brake frame, This torque motor is characterized by a finely wound high resistance winding and is of a type known in the art as capable of assuming a load and stalling under the load for appreciable length of time without harm to the motor windings. This motor, as will be hereafter shown, is rotated to a point where the mechanism driven by it resists further movement whereby the motor is stalled; it will remain stalled under load until it is reversed and the mechanism is released.

Figure 5:
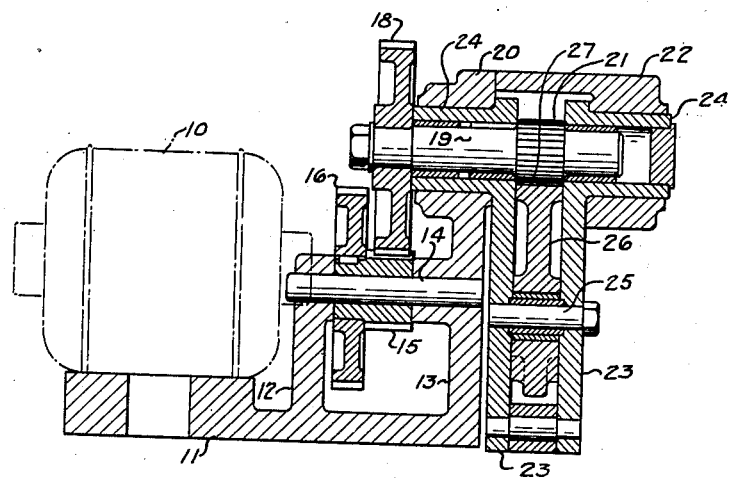
Fig. 5 is a cross-sectional view, taken on the line 5—5 of Fig. 2.
Figure 6:
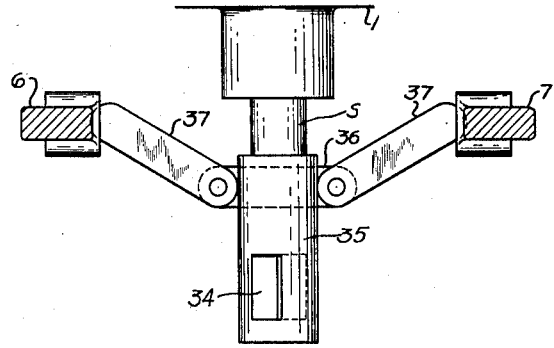
Fig. 6 is a cross-sectional view, taken on the line 6—6 of Fig. 1.

A pair of spaced bearings 12 and 13 are formed in the bracket 11 to rotatively support a shaft 14 to which pinion 15 is secured. This pinion is formed with an axially extending hub on which a gear 16 is keyed (Fig. 5). A pinion 17 mounted on the shaft of the motor 10 engages this latter gear to drive the same.

As the pinion 15 is driven by the motor the pinion in turn drives a meshing gear 18 which is keyed to one end of a shaft 19 extending through an extension 20 of the arm forming the bearing 13. The shaft 19 is suitably supported in bushings to provide an anti-friction surface. Midway between the supporting ends of the shaft 19 is a pinion 21 such that it lies between the main supporting bearing of the shaft and a bearing formed in an overlying extension 22.

To translate the rotative motion of the gear drive so far described into a reciprocatory motion to affect the shaft S, a pair of arms 23 are provided which pivot about an axis concentric with the axis of the shaft 19. To this end each of the arms 23 is provided with a hub-like extension 24 interposed between the shaft bushings and the members 20 and 22 respectively, as best shown in Fig. 5. It will be apparent that the arms 23 may be rocked about their pivot irrespective of the degree of rotation of the shaft 19.

A gear sector 26 is carried by the arms 23 and is supported thereon by a pin 25 such that the sector is disposed between the arms 23. The sector teeth 27 are positioned to mesh with the pinion 21 from which it follows that rotation of the shaft 19 will result in a rocking of the sector 26.

The end of the sector opposite the teeth carries a link 28 which is pivotally secured to one arm 29 of a bell crank lever pivoted as at 30 to an extension 31 of the bearing arm 13. The other arm 32 of the lever has a circular head 33 which is slidably disposed in an opening 34 of a plunger 35 of the clutch shifter shaft S which, as stated above, is mounted for respective movement in the frame of the press.

To effect an operative drive between the arms 6 and 7 heretofore described, a cross link 36 is provided which is secured to and moves with the plunger 35. Levers 37 are pivotally secured to the ends of the link 36 and bear against the lower ends of the levers 6 and 7 (Fig. 1).

In operation of the mechanism, the motor 10 is first energized through a suitable control switch mounted on the frame of the brake adjacent the die frame 3 and preferably on a side frame 1. As this motor is driven it operates through the gear train to cause the pinion 21 to rock the gear sector 26 to the position shown in Fig. 8. This results in rocking the levers 6 and 7 about their pivots 8 through the action of link 28, bell crank levers 29—32, plunger 35, link 36 and finally the levers 37. As the motor is thus energized the brake shoes 9 are withdrawn from the braking surface, permitting rotation of the same. It follows from the description of the operation that the shifter shaft S will have been moved. This movement will rock a clutch fork in a well-known manner to engage an axially shiftable clutch member with a clutch member mounted for rotation only. The net result is to disengage the brake and connect the main driving motor to reciprocate the slide 4.

The motor 10 will remain stalled after the aforementioned motions have taken place due to the load imposed thereon by the refusal of the linkage mechanism to move further. This state of affairs will continue until a limit switch is tripped by the return motion of the slide 4 to reverse the direction of rotation of the motor 10 and allow it to return to its initial position. This switch, indicated at 40, is secured to the frame and is engaged by a spring member 41 carried by the slide. To accomplish a similar result a reversing switch 43 is mounted adjacent the main control switch and will, when depressed by the workman, effect a manual reversal of the torque motor 10.

As the motor is reversed all of the parts will travel oppositely to their first direction of travel and will return to their initial position where the clutch is disengaged and the brake shoes 9 are forced inwardly toward each other against the braking surface to thereby stop the further movement of the slide 4.

Figure 7:
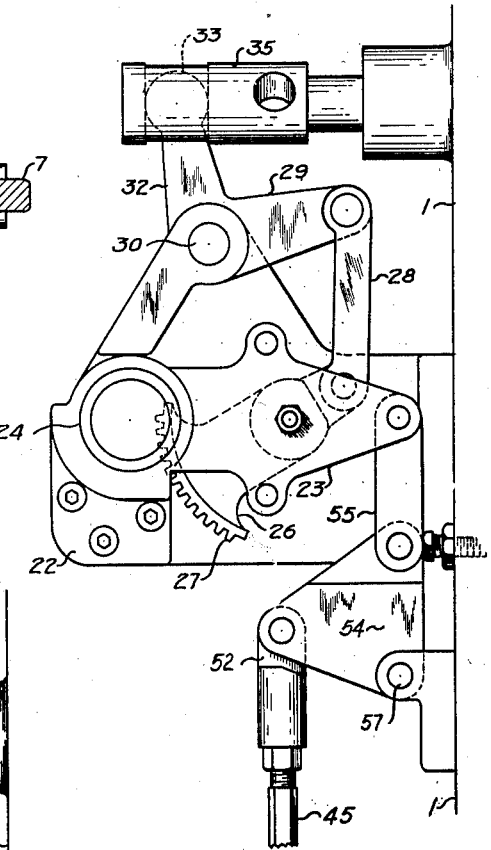
Fig. 7 is a view, illustrating the position of the various parts of the mechanism when the clutch is deenergized.
Figure 8:
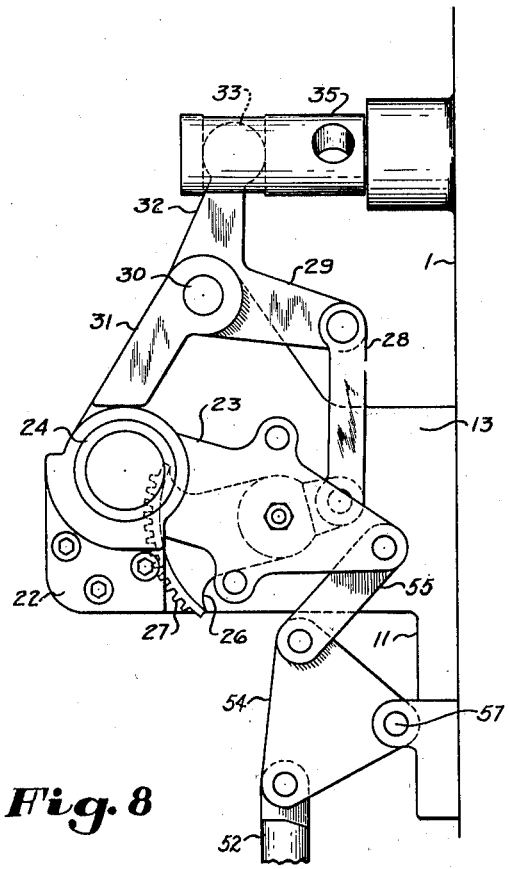
Fig. 8 is a view similar to Fig. 7, but showing the position of the various parts of the mechanism when the clutch is energized.

Mechanism is also provided for operating the clutch and brake unit manually at such times when it is desired to move the die slide in small increments, as during the "inching," which takes place when the dies are being set. This mechanism is shown in Figs. 1, 7 and 8 and comprises a hand lever 45 pivoted as at 46 to a side frame of the brake. It is mounted within easy reach of the operator and when rocked in a counter-clockwise direction, as viewed in Fig. 1, will act through a rod 47 to actuate a bell crank 48 pivoted at 49 to the side frame. As the bell crank is rocked about its pivot it will pull down on a rod 50, which at its upper end is connected by a clevis 52 to a triangular link plate 54. This plate in turn is connected by a link 55 to the members 23. The link 54 is pivoted to the brake frame at 57.

The effect of this movement is to shift the axis of the pivotal mounting of the gear sector 26 from the position shown in Fig. 7 to that shown in Fig. 8. However, since this movement is about the axis of the pinion 21, the gear sector, during such movement, will merely roll about the pinion and will, when the arms 23 are restored to their original position as shown in Fig. 7, likewise return to its original position. In this way the upper die slide may be moved by small increments or "inched" without disturbing the mechanical or automatic operation of the clutch and brake unit.

From the foregoing description it will be apparent that I have provided a new and improved brake operated mechanism which is susceptible of wide use.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a metal working tool comprising a die and ram cooperating in the working of said metal, and power means to reciprocate said ram, a clutch and brake mechanism for connecting said ram to and disconnecting it from said power means respectively, said clutch and brake mechanism comprising as a control element, a reversible torque motor characterized by an ability to be stalled under load without damage to the parts thereof, a shaft and a gear thereon driven from said motor, an arm pivotally carried concentric with said shaft, a gear sector pivotally carried by said arm, a pinion carried by said shaft in mesh with said gear sector and, linkage connecting said gear sector and said clutch mechanism to drive said clutch on rotation of said motor.

2. In a metal working tool comprising a die and ram cooperating in the working of said metal, and power means to reciprocate said ram, a clutch and brake mechanism for connecting said ram to and disconnecting it from said power means respectively, said clutch and brake mechanism comprising as a control element, a reversible electric motor, a shaft and a gear thereon driven from said motor, an arm pivotally carried concentric with said shaft, a gear sector pivotally carried by said arm, a pinion carried by said shaft in mesh with said gear sector, and linkage connecting said gear sector and said clutch mechanism to drive said clutch on rotation of said motor.

3. In a metal working tool comprising a die and ram cooperating in the working of said metal, and power means to reciprocate said ram, a clutch and brake mechanism for connecting said ram to and disconnecting it from said power means respectively, said clutch and brake mechanism comprising as a control element, a reversible electric motor, a shaft with a gear thereon driven from said motor, an arm pivotally carried concentric with said shaft, a gear sector pivotally carried by said arm, a pinion carried by said shaft in mesh with said gear sector, linkage connecting said gear sector and said clutch mechanism to drive said clutch on rotation of said motor, and manually operable means to actuate said clutch independently of said pinion.

4. In a metal working tool comprising a die and ram cooperating in the working of said metal, and power means to reciprocate said ram, a clutch and brake mechanism for connecting said ram to and disconnecting it from said power means respectively, said clutch and brake mechanism comprising as a control element, a reversible electric motor, a shaft with a gear thereon driven from said motor, an arm pivotally carried concentric with said shaft, a gear sector pivotally carried by said arm, a pinion carried by said shaft in mesh with said gear sector, linkage connecting said gear sector and said clutch mechanism to drive said clutch on rotation of said motor and a manually operable link connected to said arm to actuate said clutch independently of said pinion.

5. In a metal working tool comprising a die and ram cooperating in the working of said metal, and power means to reciprocate said ram, a clutch and brake mechanism for connecting said ram to and disconnecting it from said power means respectively, said clutch and brake mechanism comprising as a control element, a reversible torque motor characterized by an ability to be stalled under load without damage to the parts thereof, a shaft with a gear thereon driven from said motor, an arm pivotally carried concentric with said shaft, a gear sector pivotally carried by said arm, a pinion carried by said shaft in mesh with said gear sector, linkage connecting said gear sector and said clutch mechanism to drive said clutch on rotation of said motor and manually operable means to actuate said clutch independently of said pinion.

6. In a metal working tool comprising a die and ram cooperating in the working of said metal, and power means to reciprocate said ram, a clutch and brake mechanism for connecting said ram to and disconnecting it from said power means respectively, said clutch and brake mechanism comprising as a control element, a reversible torque motor characterized by an ability to be stalled under load without damage to the parts thereof, a shaft with a gear thereon driven from said motor, an arm pivotally carried concentric with said shaft, a gear sector pivotally carried by said arm, a pinion carried by said shaft in mesh with said gear sector, linkage connecting said gear sector and said clutch mechanism to drive said clutch on rotation of said motor, and a manually operable link connected to said arm to actuate said clutch independently of said pinion.

7. In a machine tool of the class described, a fixed frame comprising a pair of side plates and a bed plate all secured together, a movable work member adapted to cooperate with said fixed frame to perform a work operation, power means to actuate said work member including a shiftable clutch and a brake adapted to be applied on disengagement of said clutch, axially shiftable means for engaging and disengaging said clutch, radially shiftable means for engaging and disengaging said brake, a reversible torque motor characterized by an ability to assume a load and stall under the load without damage to the parts thereof, and mechanism connecting said motor to shift said two engaging means simultaneously and manually operable means to actuate said engaging means independently of said motor.

8. In a machine tool of the class described, a fixed frame comprising a pair of side plates and a bed plate all secured together, a movable work member adapted to cooperate with said fixed frame to perform a work operation, power means including clutch and brake mechanism to actuate said work member, a reversible electric motor carried by said frame, a gear sector pivotally carried with respect to said motor, a pinion driven by said motor in mesh with said gear sector, and linkage connecting said gear sector and said power means to engage or disengage the same upon rotation of said motor.

9. In a machine tool of the class described, a fixed frame comprising a pair of side plates and a bed plate all secured together, a movable work member adapted to cooperate with said fixed frame to perform a work operation, power means including clutch and brake mechanism to actuate said work member, a reversible electric motor carried by said frame, a gear sector pivotally carried with respect to said motor, a pinion driven by said motor in mesh with said gear sector, linkage connecting said gear sector and said power means to engage or disengage the same upon rotation of said motor, and manually operable means pivotally carried by one of said side plates to actuate said power means independently of said motor.

10. In a machine tool of the class described, a fixed frame comprising a pair of side plates and a bed plate all secured together, a movable work member adapted to cooperate with said fixed frame to perform a work operation, power means including clutch and brake mechanism to actuate said work member, a reversible electric motor carried by said frame, a gear sector pivotally carried with respect to said motor, a pinion driven by said motor in mesh with said gear sector, linkage connecting said gear sector and said power means to engage or disengage the same upon rotation of said motor, and mechanism carried by said frame and said movable work member and adapted to cooperate to reverse the direction of rotation of said motor at a predetermined point in the cycle of operation of said movable work member.

11. In a machine tool of the class described, a fixed frame comprising a pair of side plates and a bed plate all secured together, a movable work member adapted to cooperate with said fixed frame to perform a work operation, power means including clutch and brake mechanism to actuate said work member, a reversible electric motor carried by said frame, a gear sector pivotally carried with respect to said arm, a pinion driven by said motor in mesh with said gear sector, linkage connecting said gear sector and said power means to engage or disengage the same upon rotation of said motor, manually operable means pivotally carried by one of said side plates to actuate said power means independently of said motor, mechanism carried by said frame and said movable work member and adapted to cooperate to reverse the direction of rotation of said motor at a predetermined point in the cycle of operation of said movable work member.

12. In a machine tool of the class described, a fixed frame comprising a pair of side plates and a bed plate all secured together, a movable work member adapted to cooperate with said fixed frame to perform a work operation, power means including clutch and brake mechanism to actuate said work member, an electric motor carried by said frame, a shaft with a gear thereon driven from said motor, an arm pivotally carried concentric with said shaft, a gear sector pivotally carried by said arm, a pinion carried by said shaft in mesh with said gear sector, linkage connecting said gear sector and said power means to engage or disengage the same upon rotation of said motor and manually operable means pivotally carried by one of said side plates to actuate said power means independently of said pinion.

13. In a machine tool of the class described, a fixed frame comprising a pair of side plates and a bed plate all secured together, a movable work member adapted to cooperate with said fixed frame to perform a work operation, power means including clutch anad brake mechanism to actuate said work member, a reversible electric motor carried by said frame, a shaft with a gear thereon driven from said motor, an arm pivotally carried concentric with said shaft, a gear sector pivotally carried by said arm, a pinion carried by said shaft in mesh with said gear sector, linkage connecting said gear sector and said power means to engage or disengage the same upon rotation of said motor, manually operable means pivotally carried by one of said side plates to actuate said power means independently of said pinion and mechanism carried by said frame and said movable work member and adapted to cooperate to reverse the direction of rotation of said motor at a predetermined point in the cycle of operation of said movable work member.

14. In a machine tool of the class described, a fixed frame comprising a pair of side plates and a bed plate all secured together, a movable work member adapted to cooperate with said fixed frame to perform a work operation, power means including clutch and brake mechanism to actuate said work member, a reversible electric motor carried by said frame, a shaft with a gear thereon driven from said motor, an arm pivotally carried concentric with said shaft, a gear sector pivotally carried by said arm, a pinion carried by said shaft in mesh with said gear sector, linkage connecting said gear sector and said power means to engage or disengage the same upon rotation of said motor and mechanism carried by said frame and said movable work member and adapted to cooperate to reverse the direction of rotation of said motor at a predetermined point in the cycle of operation of said movable work member.

LARKIN R. WILLIAMSON.